(12) United States Patent
Vehmeijer et al.

(10) Patent No.: US 10,612,693 B2
(45) Date of Patent: Apr. 7, 2020

(54) MARINE PIPELAYING FRICTION CLAMP DEVICE AND METHOD OF LAYING A PIPELINE

(71) Applicant: ITREC B.V., Schiedam (NL)

(72) Inventors: Terence Willem August Vehmeijer, Schiedam (NL); Stefan Cornelis Van Ruyven, Schiedam (NL); Joop Roodenburg, Schiedam (NL); Jeroen Adrianus Joseph Donkers, Schiedam (NL); Wouter Johannes Slob, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 16/485,111

(22) PCT Filed: Feb. 8, 2018

(86) PCT No.: PCT/NL2018/050088
§ 371 (c)(1),
(2) Date: Aug. 9, 2019

(87) PCT Pub. No.: WO2018/147735
PCT Pub. Date: Aug. 16, 2018

(65) Prior Publication Data
US 2019/0376619 A1 Dec. 12, 2019

(30) Foreign Application Priority Data
Feb. 10, 2017 (NL) .................................... 2018357

(51) Int. Cl.
*F16L 1/20* (2006.01)
(52) U.S. Cl.
CPC .................................... *F16L 1/207* (2013.01)
(58) Field of Classification Search
CPC .................................... F16L 1/20; F16L 1/207
See application file for complete search history.

(56) References Cited

U.S. PATENT DOCUMENTS 2,589,159 A   3/1952  Stone
3,140,523 A * 7/1964  Taylor, Jr. ............... E21B 19/07
                                                    294/102.2
(Continued)

FOREIGN PATENT DOCUMENTS

GB        2 392 934 A      3/2004
WO     WO 01/35011 A1      5/2001
WO  WO 2010/061280 A1      6/2010

OTHER PUBLICATIONS

International Search Report for PCT/NL2018/050088 (PCT/ISA/210) dated May 18, 2018.
(Continued)

*Primary Examiner* — Benjamin F Fiorello
(74) *Attorney, Agent, or Firm* — Birch, Stewart, Kolasch & Birch, LLP

(57) ABSTRACT

The present invention relates to a marine pipelaying friction clamp device for frictionally retaining an offshore pipeline having a longitudinal axis, comprising multiple clamping units (20). Each clamping unit comprises a friction pad (21) and an associated force actuator (22), and further comprises a base (25) fixed to the actuator, wherein the friction pad is rotatably connected to the base via a single axis (H1, H2) hinge mechanism defining a single hinge axis parallel to the longitudinal axis. The single axis hinge mechanism comprises first and second complementary semi-cylindrical hinge surfaces, allowing a rotation of the friction pad about the single hinge axis over 2-20° relative to the base. The friction pad is also axially connected to the base via complementary axial load surfaces (31, 33) on the base (25) and on the friction pad (21).

7 Claims, 16 Drawing Sheets

(56) References Cited

U.S. PATENT DOCUMENTS

| | | | | |
|---|---|---|---|---|
| 4,475,607 | A * | 10/1984 | Haney | E21B 19/16 |
| | | | | 173/166 |
| 4,715,456 | A * | 12/1987 | Poe, Jr. | E21B 19/10 |
| | | | | 175/423 |
| 5,335,756 | A * | 8/1994 | Penisson | E21B 19/10 |
| | | | | 188/67 |
| 6,729,803 | B1 | 5/2004 | Baylot | |
| 7,226,244 | B1 | 6/2007 | De Groot et al. | |
| 8,641,325 | B2 * | 2/2014 | Baylot | B63B 35/03 |
| | | | | 405/166 |
| 9,481,092 | B2 * | 11/2016 | Suga | B25J 15/0028 |
| 9,494,257 | B2 * | 11/2016 | Konate | H02G 1/06 |
| 9,803,435 | B2 * | 10/2017 | Louviere | E21B 19/10 |
| 10,228,078 | B2 * | 3/2019 | Roodenburg | F16L 1/20 |
| 10,288,194 | B2 * | 5/2019 | Roodenburg | E21B 19/24 |
| 2004/0051326 | A1 * | 3/2004 | Belik | B25B 5/147 |
| | | | | 294/86.15 |

OTHER PUBLICATIONS

Written Opinion of the International Searching Authority for PCT/NL2018/050088 (PCT/ISA/237) dated May 18, 2018.

* cited by examiner

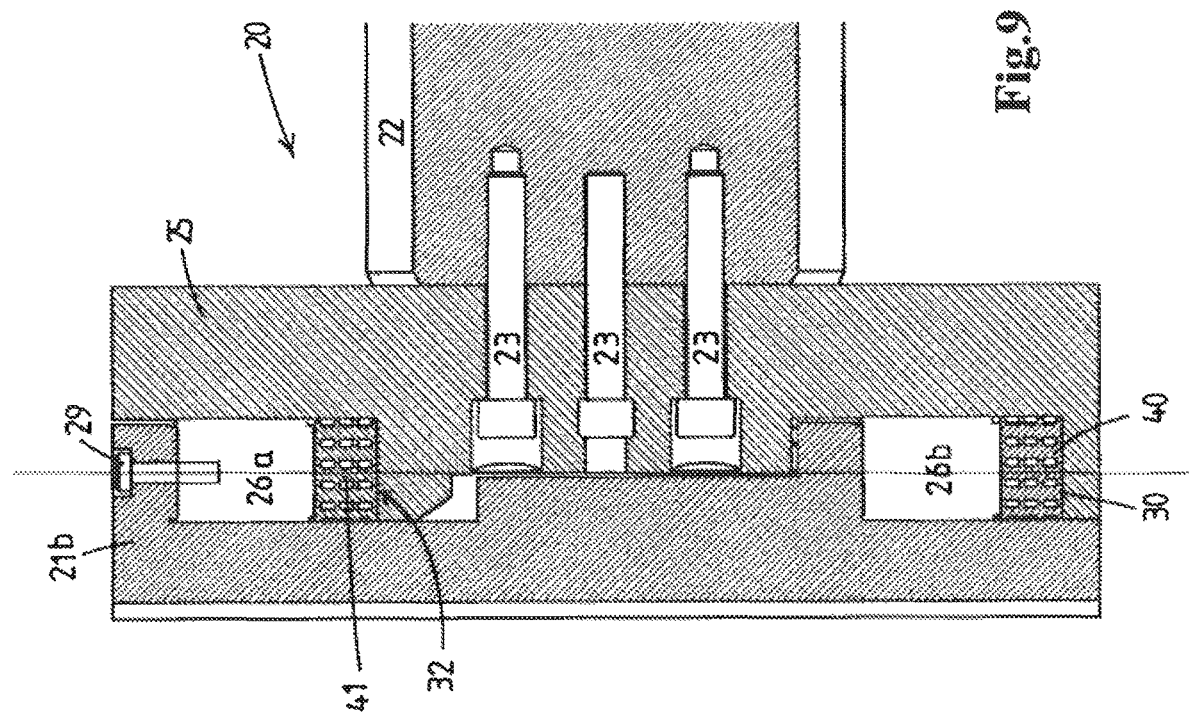

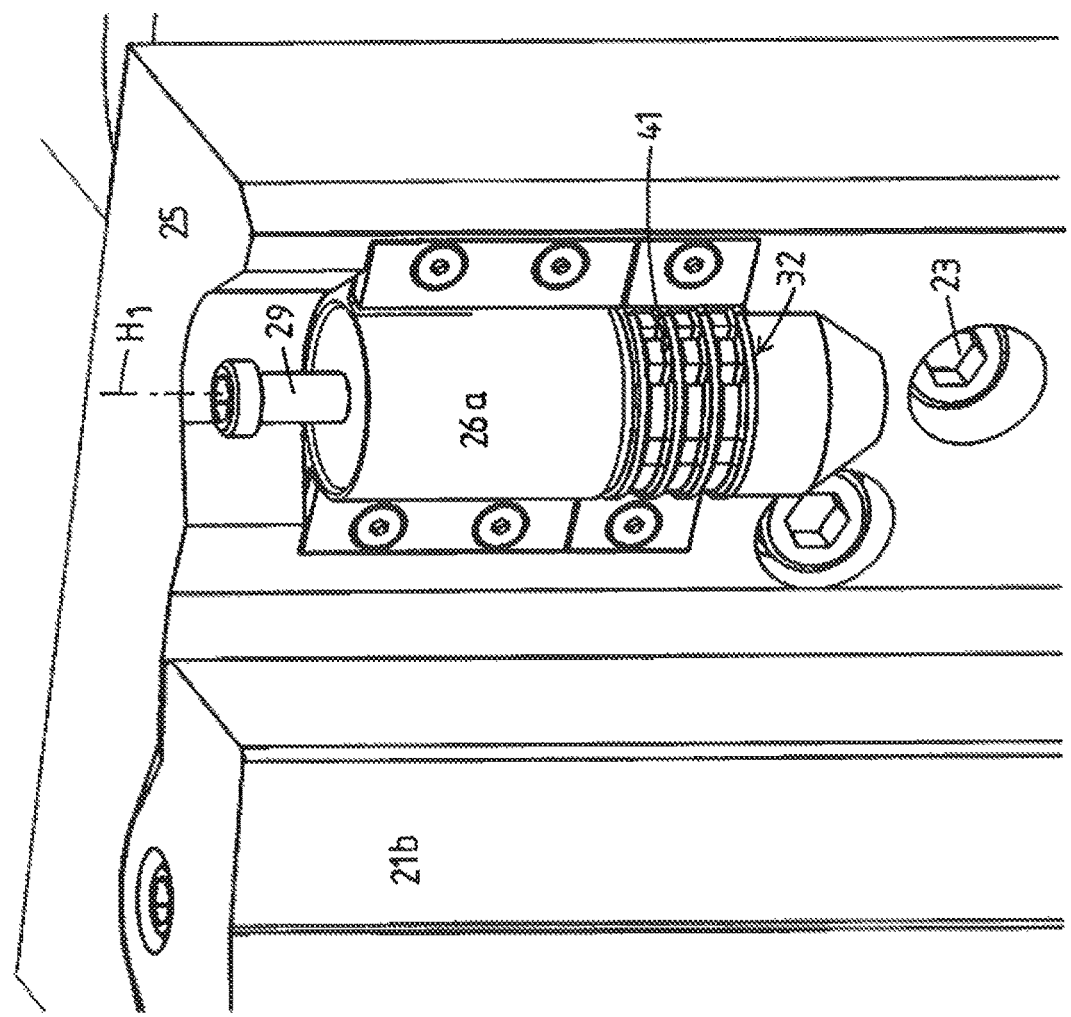

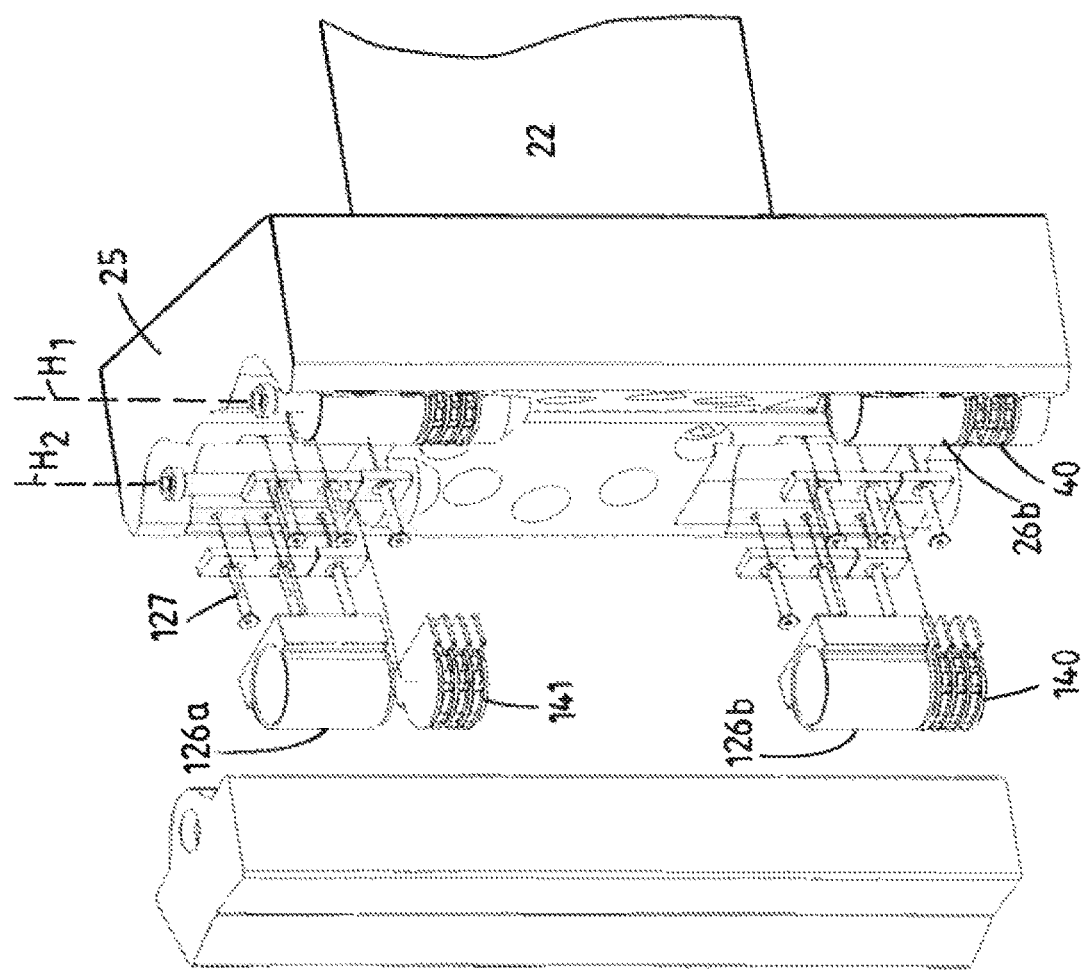

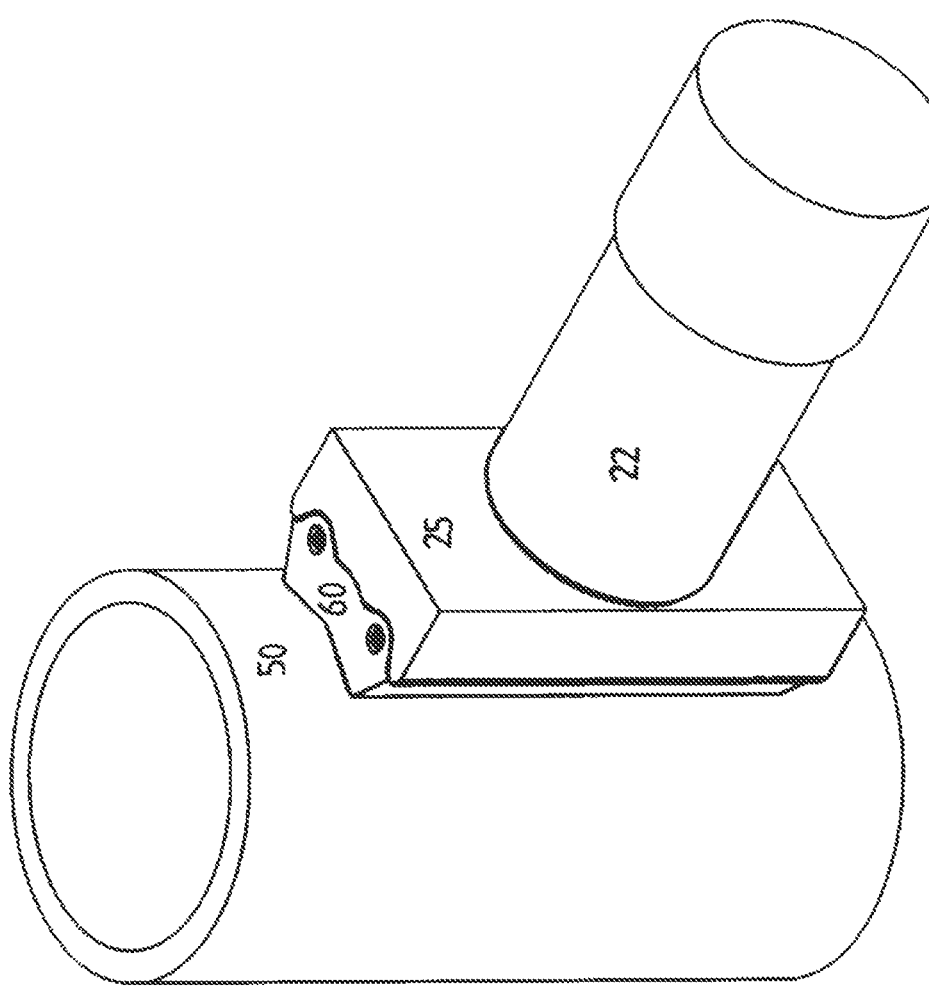

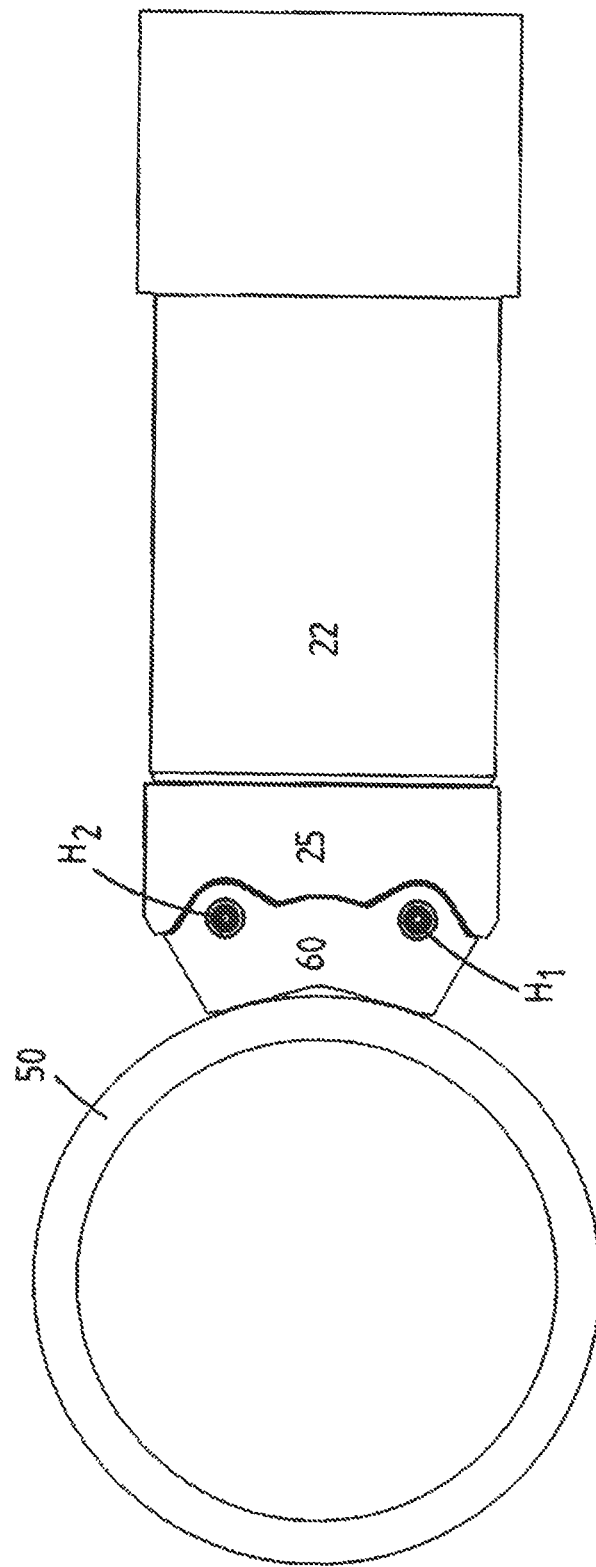

MARINE PIPELAYING FRICTION CLAMP DEVICE AND METHOD OF LAYING A PIPELINE

The present invention relates to a marine pipelaying friction clamp device for frictionally retaining an offshore pipeline having a longitudinal axis, to be launched into the sea during the laying of the pipeline from a vessel, and to a method of laying a pipeline wherein use is made of such a clamp.

Such marine pipelaying friction clamps are commonly applied in the art, e.g. as a hang-off clamp or as a headclamp in a pipelay tower. It is common for such a clamp device to have
- a supporting frame that is adapted to be supported by the vessel;
- wherein the frame supports, in series in a longitudinal direction of the clamp device which corresponds to the longitudinal axis of the pipeline to be retained, multiple annular arrays of clamping units adapted to simultaneously engage separate portions of the pipeline,
- wherein each annular array of clamping units comprises multiple clamping units,
- wherein each clamping unit comprises a friction pad adapted to frictionally engage a portion of the pipeline and an associated force actuator, e.g. a radially mounted hydraulic cylinder, adapted to radially force the friction pad against the pipeline.

As a result of the friction forces exerted onto the pipeline, pipelines suffer damage. It is an aim of the present invention to reduce the damage.

This aim is achieved in that:
- each clamping unit further comprises a base fixed to the actuator,
- wherein the friction pad is rotatably connected to the base via a single axis hinge mechanism defining a single hinge axis parallel to the longitudinal axis, (so as to obtain adaptation of the friction pad onto the pipeline by rotation of the friction pad) the single axis hinge mechanism comprises:
  - a first hinge portion on the base, comprising a first semi-cylindrical hinge surface, and
  - a second hinge portion on the friction pad, comprising a complementary second semi-cylindrical hinge surface, which first and second semi-cylindrical hinge surfaces are adapted to:
    a) transmit the radial force of the actuator to the friction pad, and
    b) allow a rotation of the friction pad about the single hinge axis over 2-20° relative to the base;
- and wherein the friction pad is axially connected to the base via:
  - a first axial load surface on the base,
  - a second complementary axial load surface on the friction pad, which first and second axial load surfaces are adapted to transmit the axial force exerted by the pipeline on the friction pad from the friction pad to the base.

As a result of this single hinge axis the clamping unit obtains adaptation of the friction pad onto the pipeline by rotation of the friction pad. This is in particular advantageous when the pipeline does not have a constant cross-section, but has portions having a more oval cross-section.

In embodiments, each clamping unit comprises a single base and two radially adjacent friction pads, each friction pad being rotatably connected to the base via an associated single axis hinge mechanism, wherein preferably the single hinge axis of the first friction pad and the single hinge axis of the second friction pad have the same distance to a central axis of the actuator. The more friction pads, the better the adaptation of the clamping unit to the pipeline. With the symmetrically arranged hinge axes about the central axis of the actuator an advantageous configuration is achieved.

In embodiments, the first hinge portion is formed by a cylindrical hinge element connected to the base, e.g. to the first axial load surface on the base. Alternatively, it is also conceivable that the first semi-cylindrical hinge surface is part of the base pad surface.

Further embodiments of the invention are defined in the dependent claims.

The invention will be further elucidated in relation to the drawings, in which:

FIG. 1 is a perspective view of a marine pipelaying friction clamp device according to the present invention;

FIG. 2. is a perspective view of an annular array of clamping units according to the present invention;

FIG. 9 is a cross-section in a vertical plane through the clamping unit of FIGS. 3 and 4;

FIG. 10 is a detail of the disassembled clamping unit of FIG. 8;

FIG. 11b is a cross-section of the resilient support mechanism of FIG. 11a;

FIG. 12 is an exploded view of the clamping units of FIGS. 3 and 4;

FIG. 15 is an opposite perspective view of the clamping unit of FIG. 14, engaging on a pipeline;

FIG. 16. Is a top view of the clamping unit of FIGS. 14 and 15, engaging on a pipeline.

Figure 1:
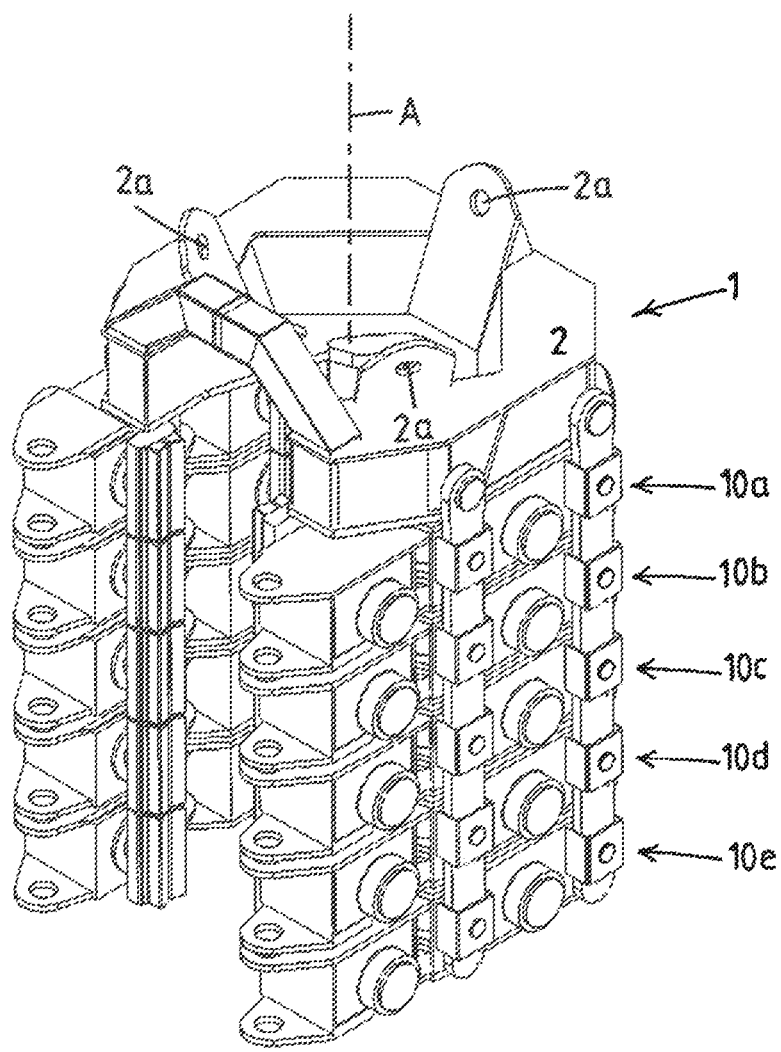

FIG. 1 shows a marine pipelaying friction clamp device 1 for frictionally retaining an offshore pipeline having a longitudinal axis A, to be launched into the sea during the laying of the pipeline from a vessel.

The clamp device 1 comprises a supporting frame 2 that is adapted to be supported by the vessel, e.g. by a pipelay tower provided on the vessel, e.g. via eyelets 2a.

The supporting frame 2 supports, in series in a longitudinal direction of the clamp device, which corresponds to the longitudinal axis A of the pipeline to be retained, multiple annular arrays 10a-10e, of clamping units, adapted to simultaneously engage separate portions of the pipeline.

Figure 2:
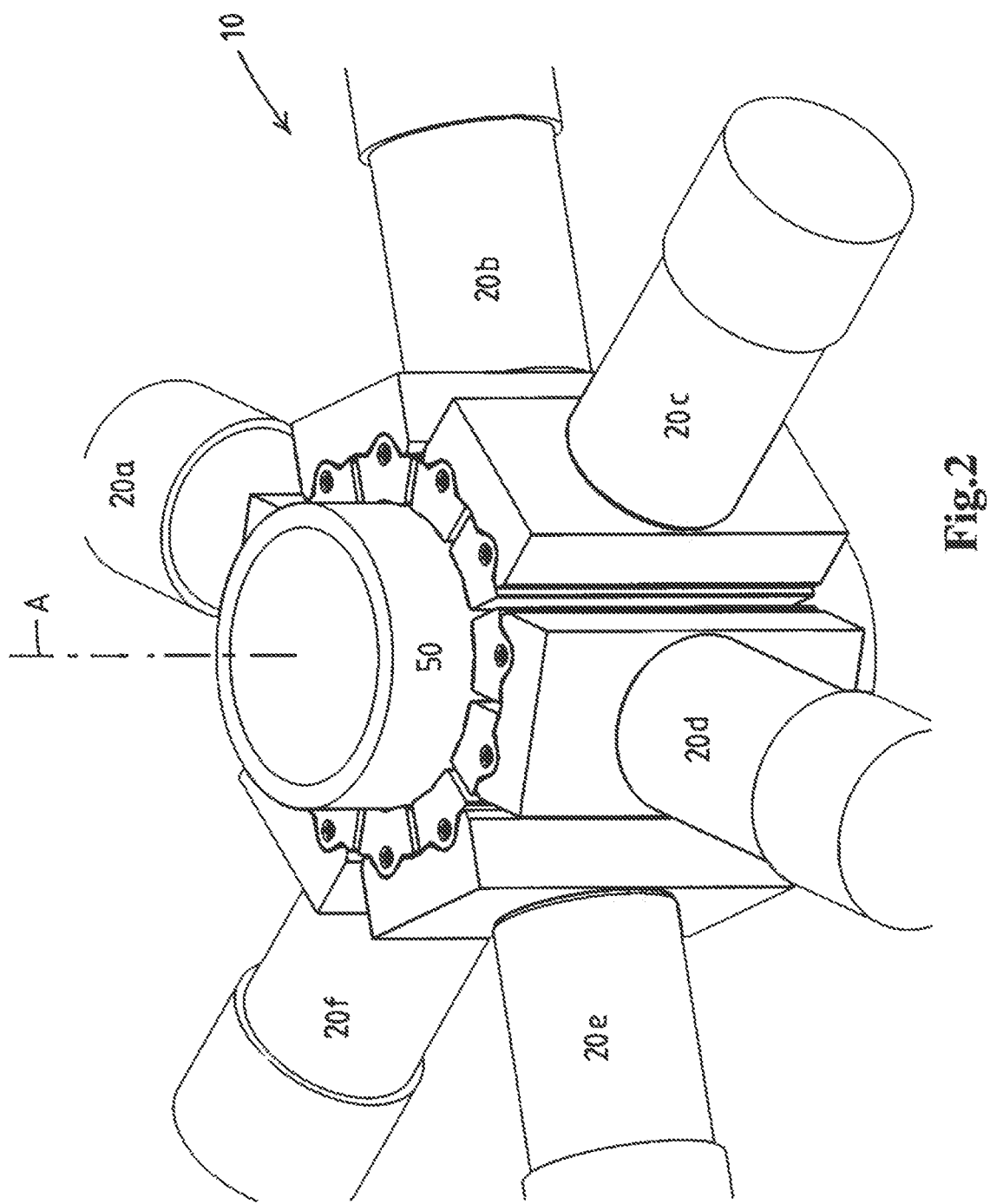

In FIG. 2, such an annular array 10 of clamping units 20a-20f engaging on a pipeline 50 is shown in more detail. Here, it is visible that an annular array of clamping units comprises multiple, here 6 clamping units.

Figure 3:
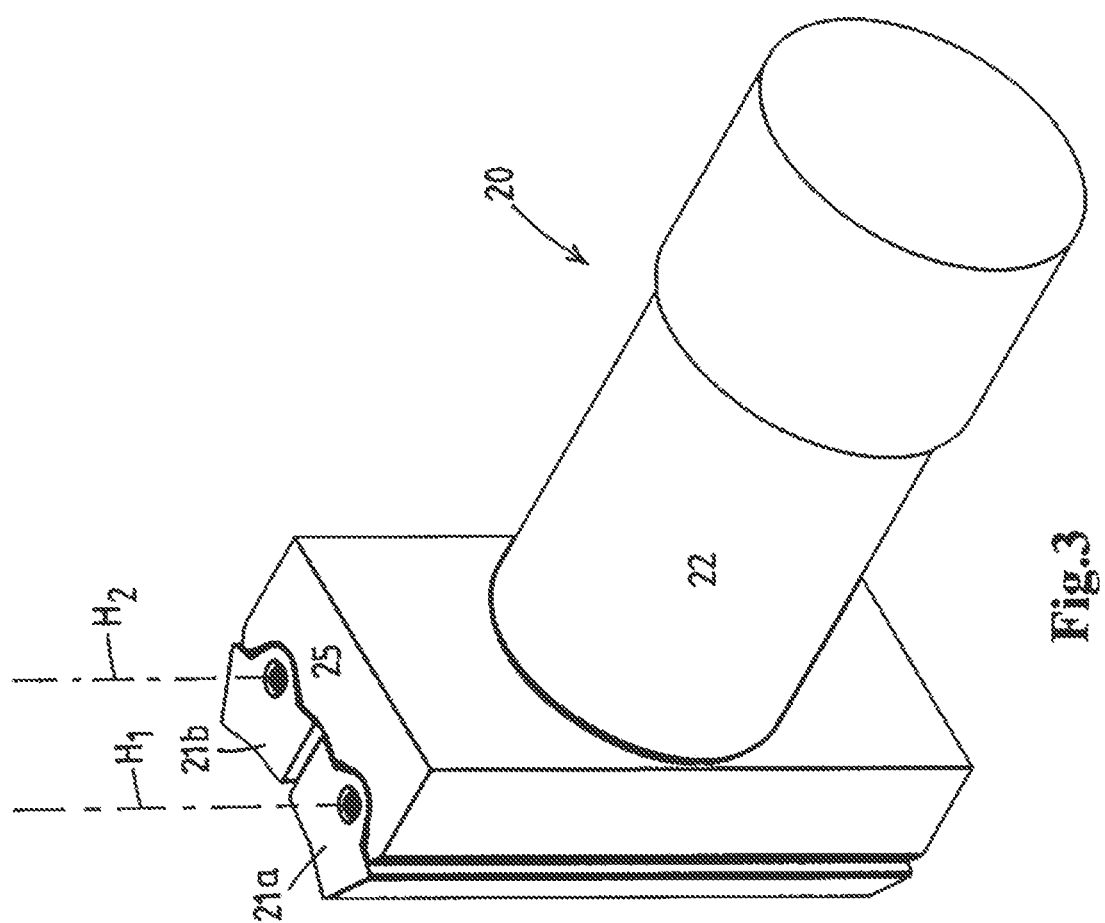
FIG. 3 is a detailed perspective view of a clamping unit of FIG. 2.
Figure 4:
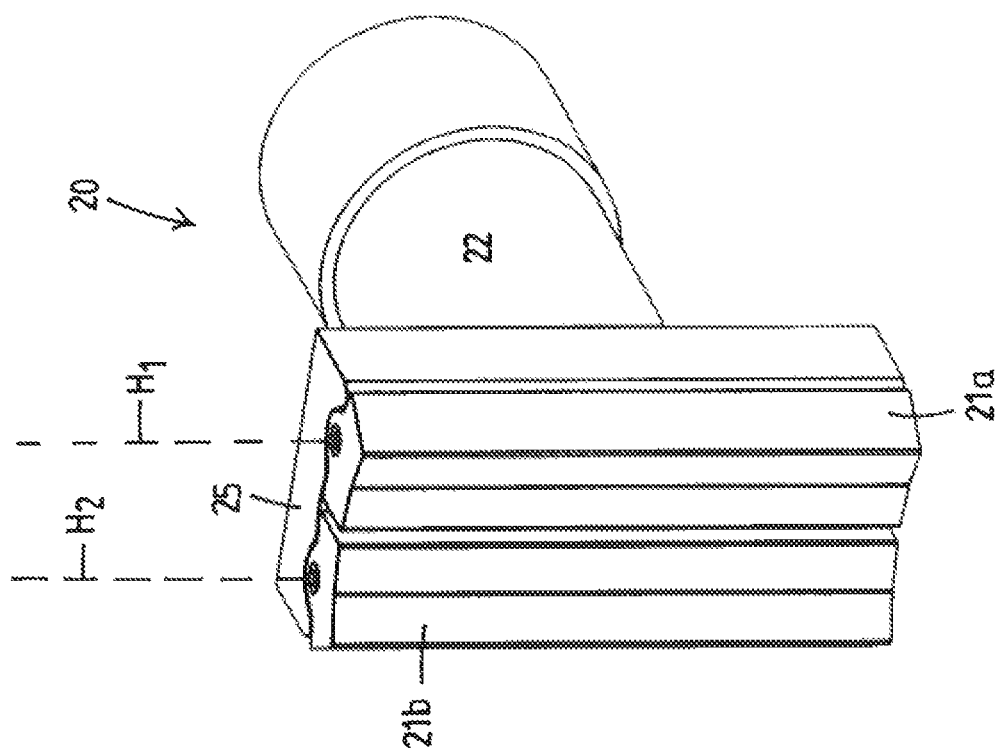
FIG. 4 is an opposite perspective view of the clamping unit of FIG. 3.

In FIGS. 3 and 4 a clamping unit 20 is shown in further detail. In the shown embodiment, a clamping unit 20 comprises two friction pads 21a, 21b adapted to frictionally engage a portion of the pipeline, and an associated force actuator 22, e.g. a radially mounted hydraulic cylinder, adapted to radially force the friction pad against the pipeline. The clamping unit further comprises a fixed base 25 interposed between the friction pads 21a, 21b and fixed to the actuator 22. The base has a length essentially corresponding to that of a friction pad. Here, the width of the base 25 essentially corresponds to that of 2 friction pads.

Commonly, both the friction pad and the base are made of steel or a copper-aluminium alloy.

Each of the friction pads 21a, 21b is rotatably connected to the base 25 via a single axis hinge mechanism defining a single hinge axis H1, H2, parallel to the longitudinal axis A.

Figure 5:
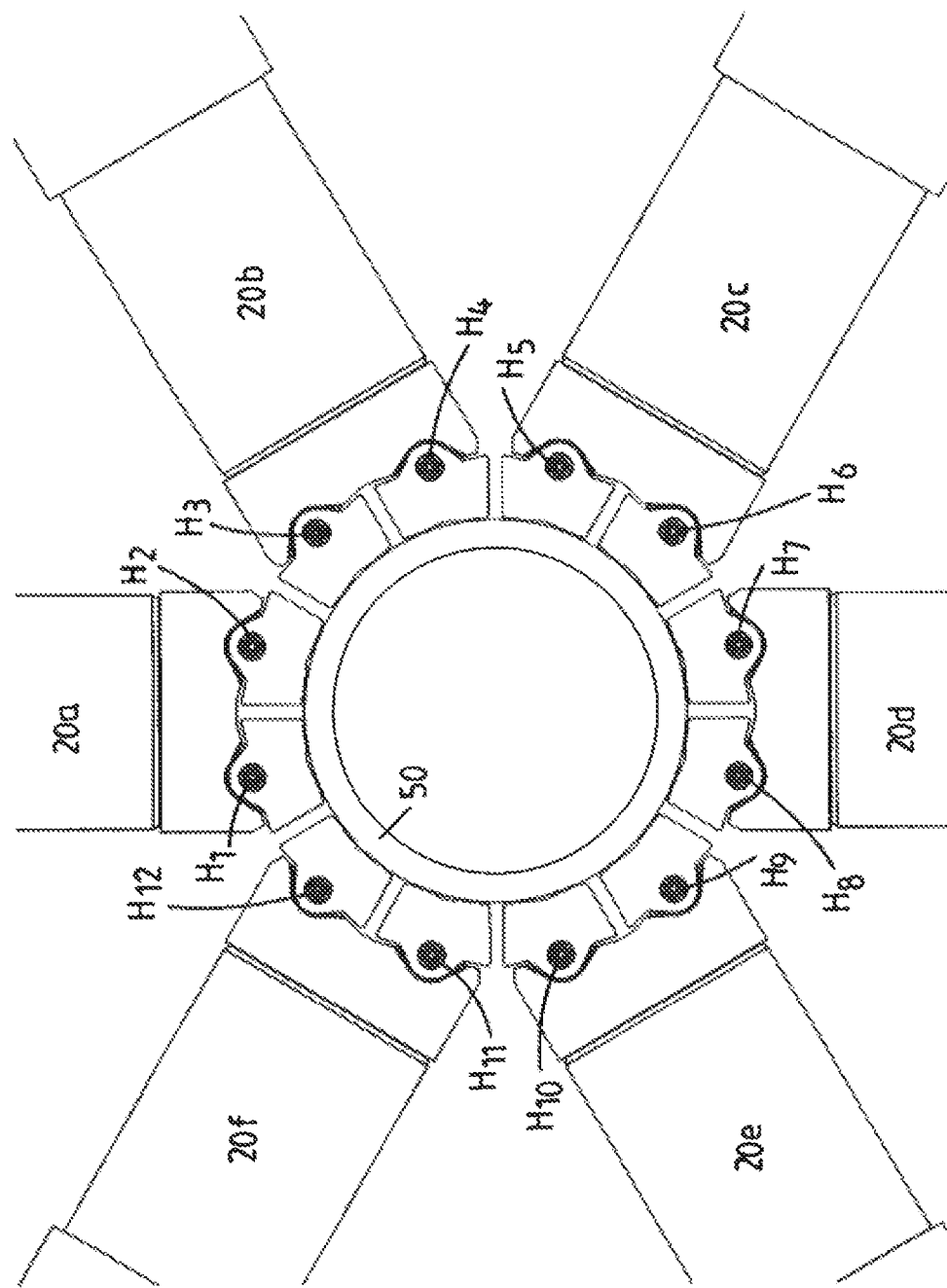
FIG. 5 is a top view of the annular array of clamping units of FIG. 2.
Figure 6:
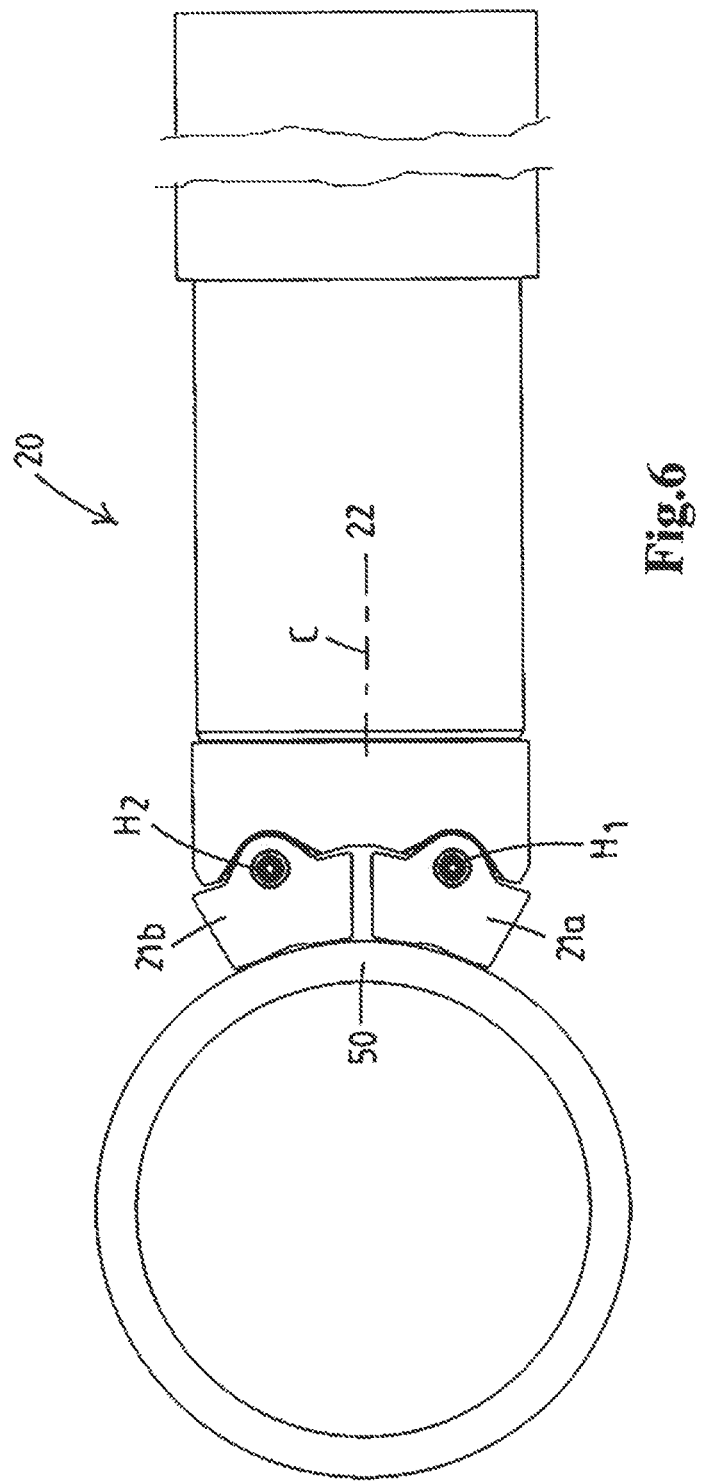
FIG. 6 is a top view of the clamping unit of FIGS. 3 and 4.
Figure 7:
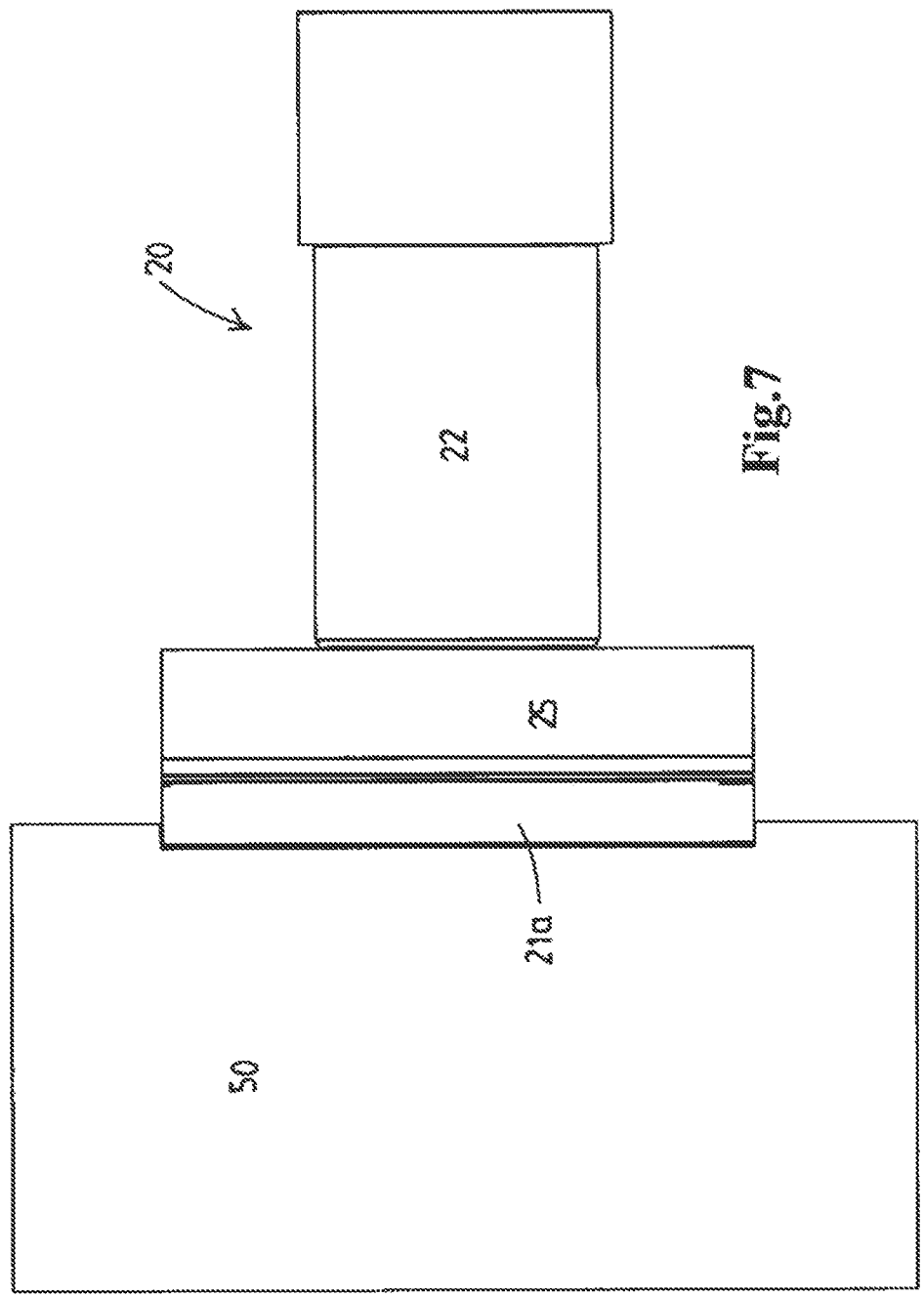
FIG. 7 is a side view of the clamping unit of FIGS. 3 and 4.

From the top view of FIG. 5 follows that this configuration results in 12 hinge axes H1-H12 for 12 friction pads in an array of 6 clamping units. It is advantageous, as shown in FIG. 6, that the single hinge axis H1 of the first friction pad and the single hinge axis H2 of the second friction pad have the same distance to a central axis of the actuator.

Figure 8:
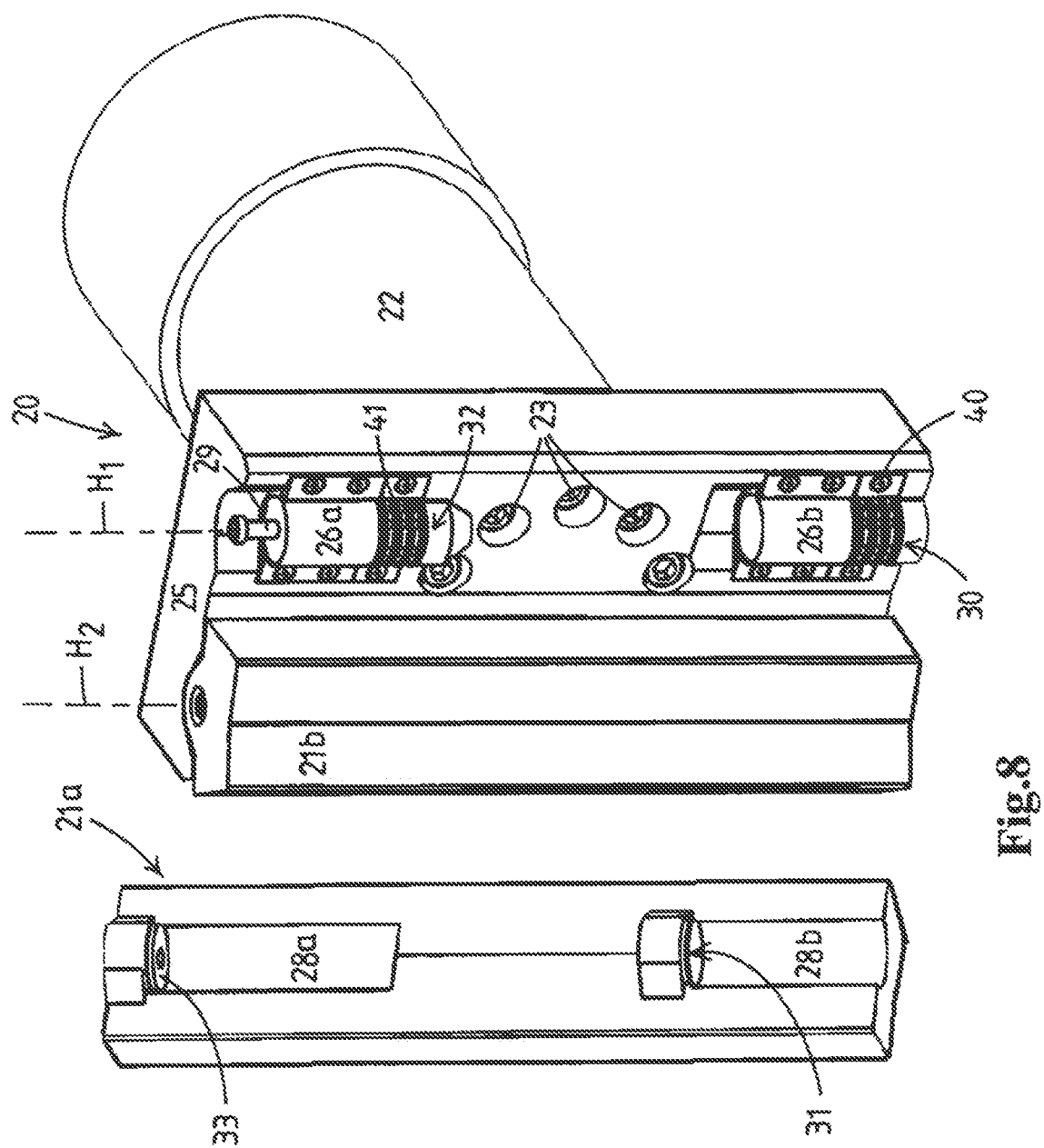
FIG. 8 is a perspective view of a disassembled clamping unit.

In FIG. 8 the single axis hinge mechanism is shown in further detail. Here it is visible that in the shown embodiment, each single axis hinge mechanism comprises:

two axially spaced first hinge portions 26a, 26b on the base 25, comprising a first semi-cylindrical hinge surface, and two axially spaced second hinge portions 28a, 28b on the friction pad, comprising a complementary second semi-cylindrical hinge surface, which first and second semi-cylindrical hinge surfaces are adapted to:

a) transmit the radial force of the actuator to the friction pad, and b) allow a rotation of the friction pad about the single hinge axis over 2-20° relative to the base.

Figure 13:
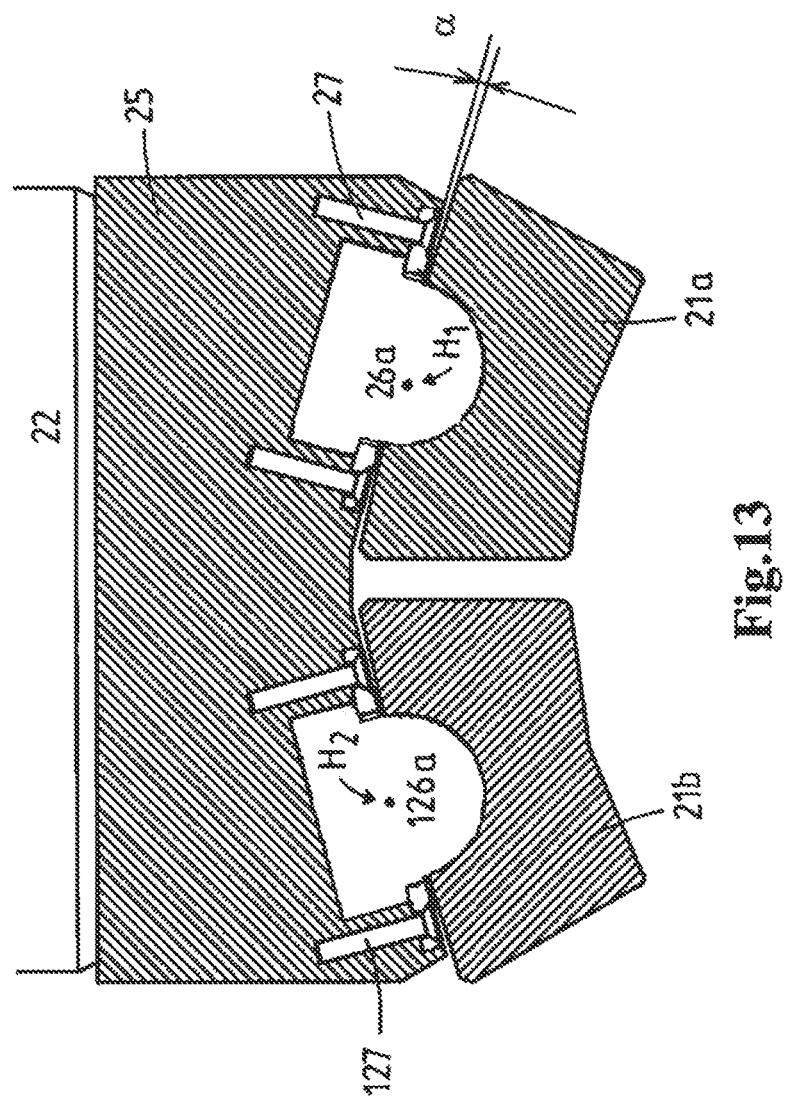
FIG. 13 is a cross-section in a horizontal plane through the clamping unit of FIGS. 3 and 4.

In the shown embodiment, the hinge portions 26a, 26b are formed by semi-cylindrical hinge elements, which are connected to the base 25 by bolts 27. This is in particular visible in the cross-sectional view of FIG. 13. Here, also the rotation a of the friction pad about the single hinge axis relative to the base 25 is shown, here about 5°. The second hinge portions 28a, 28b are here formed as axially spaced, semi-cylindrical recesses in the friction pad. A connection pin 29 is provided between the first hinge portion 26a and the second hinge portion 28a. Alternative connection mechanisms for the single axis hinge mechanism are also conceivable.

The friction pads 21a, 21b are axially connected to the base 25 via:

a set of axially spaced first axial load surfaces 30, 32 on the base 25, a set of axially spaced second complementary axial load surfaces 31, 33 on the friction pad, which first and second axial load surfaces are adapted to transmit the axial force exerted by the pipeline on the friction pad from the friction pad to the base.

Here, the cylindrical hinge elements 26a, 26b are connected to the first axial load surfaces 32, 30 respectively on the base 25.

It is noticed that in FIG. 8 only the single axis hinge mechanism of single hinge axis H1 is shown. In FIG. 12 also the single axis hinge mechanism of single hinge axis H2 is shown, in which similar parts have been given the same reference numeral to which 100 has been added.

In the shown embodiment, the second axial load surfaces 31, 33 on the friction pad are formed by end surfaces of the second hinge portions 28a, 28b, which are here formed as axially spaced, semi-cylindrical recesses in the friction pad.

Furthermore, a resilient support mechanism 40, 41 is provided between the first axial load surface 30, 32 and the second axial load surface 31, 33, supporting the friction pad resiliently in an axial direction. In the shown embodiment, the resilient support mechanism 40 is provided between the first axial load surface 30 and the first hinge portion on the base. Consequently, the first hinge portion 26b should allow for such axial resiliency.

Alternatively, it is also conceivable that the resilient support mechanism is provided between the first hinge portion 26b on the base and the second axial load surface 31, in which embodiment the first hinge portion 26b does not have to allow for axial resiliency and can be fixed to, or integrated with the base 25.

In FIG. 9, it is visible that the base 25 is fixed to the actuator 22 via bolts 23.

Figure 11B:
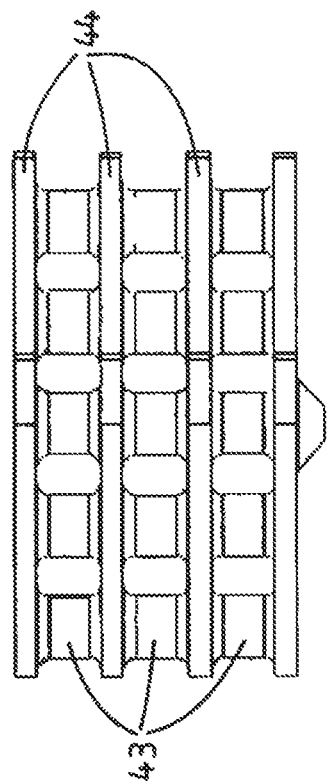
Figure 11A:
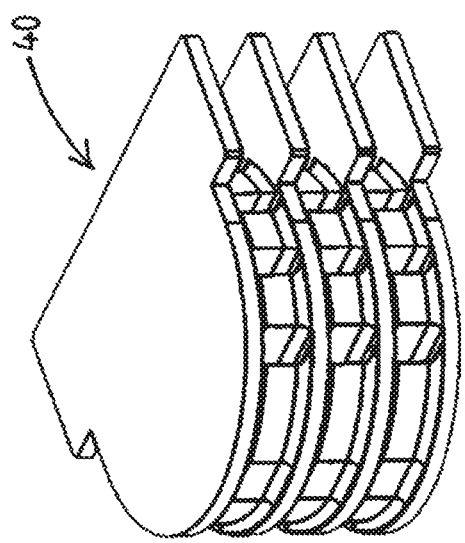
FIG. 11a is a perspective view on a resilient support mechanism of a clamping unit.

The resilient support mechanism 40 is shown in further detail in FIGS. 11a and 11b, from which follows that the resilient support mechanism comprises a stack of elastic elements 43, and a stack of plates 4) alternating with the elastic elements 43. The elastic elements 43 are preferably rubber or polyurethane panels, and the plates 44 are made of metal, e.g. 30 titanium. Here, the plates 44 are wider and longer than the elastic members 43.

Figure 14:
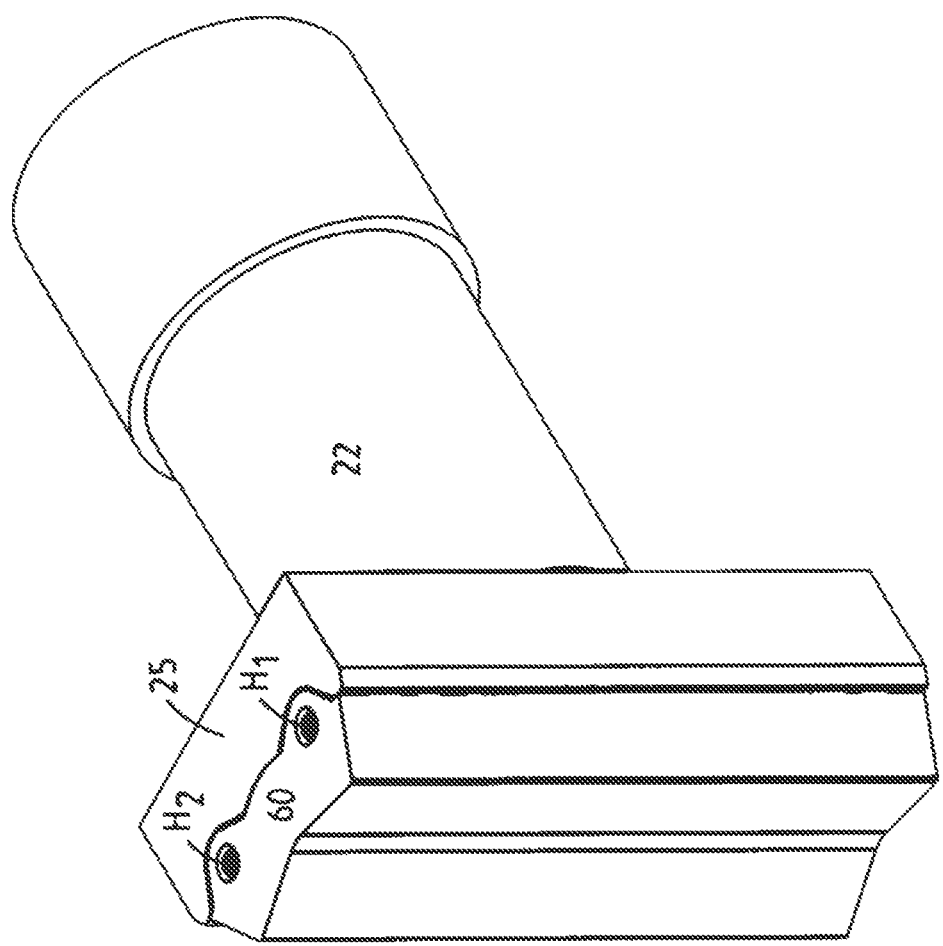
FIG. 14 is a perspective view of an alternative configuration of the clamping unit.

In FIGS. 14-16, an alternative configuration of the clamping unit is shown comprising the same base 25 fixed to the actuator. Also, two single axis hinge mechanisms are provided defining two single hinge axes H1 and H2. However, as only a single friction pad 60 is connected to the base via these hinge mechanisms, rotation of the friction pad 60 is no longer allowed. Accordingly, with basis configuration of the clamping unit, it is both possible to provide a rotatable friction pad and a non-rotatable friction pad. In particular, the friction pad 60 is provided with recesses engaging with pins 29, 129 of the single axis hinge mechanism.

The invention claimed is:

1. A marine pipelaying friction clamp device for frictionally retaining an offshore pipeline having a longitudinal axis, to be launched into the sea during the laying of the pipeline from a vessel, the clamp device comprising:

a supporting frame that is adapted to be supported by the vessel, wherein the supporting frame supports, in series in a longitudinal direction of the clamp device which corresponds to the longitudinal axis of the pipeline to be retained, multiple annular arrays of clamping units adapted to simultaneously engage separate portions of the pipeline, wherein each annular array of clamping units comprises multiple clamping units, wherein each clamping unit comprises a friction pad adapted to frictionally engage a portion of the pipeline and an associated force actuatoradapted to radially force the friction pad against the pipeline, wherein each clamping unit further comprises a base fixed to the actuator, wherein the friction pad is rotatably connected to the base via a single axis hinge mechanism defining a single hinge axis parallel to the longitudinal axis, the single axis hinge mechanism comprises:

a first hinge portion on the base, comprising a first semi-cylindrical hinge surface, and a second hinge portion on the friction pad, comprising a complementary second semi-cylindrical hinge surface, which first and second semi-cylindrical hinge surfaces are adapted to transmit the radial force of the actuator to the friction pad, and allow a rotation of the friction pad about the single hinge axis over 2-20° relative to the base, wherein the friction pad is axially connected to the base via: a first axial load surface on the base, and a second complementary axial load surface on the friction pad, the first and second axial load surfaces being adapted to transmit the axial force exerted by the pipeline on the friction pad from the friction pad to the base, wherein a resilient support mechanism is provided between the first axial load surface and the second axial load surface, supporting the friction pad resiliently in an axial direction, and wherein the resilient support mechanism is provided between the first axial load surface and the first hinge portion on the base.

2. The marine pipelaying friction clamp device according to claim 1, wherein each clamping unit comprises a single base and two radially adjacent friction pads, each friction pad being rotatably connected to the base via an associated single axis hinge mechanism.

3. The marine pipelaying friction clamp device according to claim 2, wherein the single hinge axis of the first friction pad and the single hinge axis of the second friction pad have the same distance to a central axis of the actuator.

4. The marine pipelaying friction clamp device according to claim 1, wherein the first hinge portion is formed by a cylindrical hinge element connected to the base.

5. The marine pipelaying friction clamp device according to claim 1, wherein a single axis hinge mechanism comprises two axially spaced first hinge portions and second hinge portions.

6. The marine pipelaying friction clamp device according to claim 1, wherein the second axial load surface on the friction pad is formed by an end surface of the second hinge portion.

7. A method of laying a pipeline with a laying vessel provided with the marine pipelaying friction clamp device according to claim 1, the method comprising the step of clamping the pipeline by the marine pipelaying friction clamp.

* * * * *